UNITED STATES PATENT OFFICE.

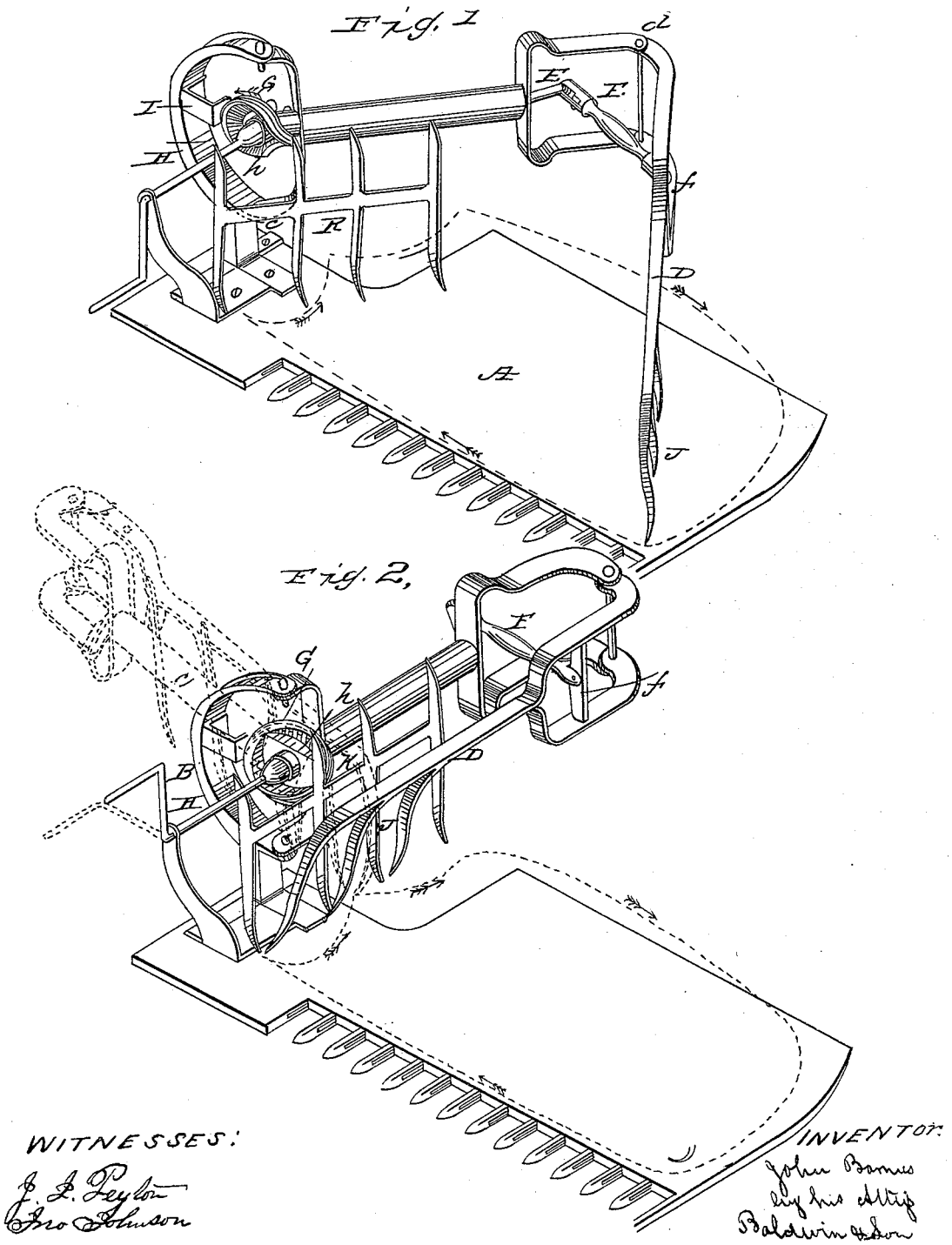

JOHN BARNES, OF ROCKFORD, ILLINOIS.

IMPROVEMENT IN HARVESTER-RAKES.

Specification forming part of Letters Patent No. 53,942, dated April 17, 1866.

*To all whom it may concern:*

Be it known that I, JOHN BARNES, of Rockford, in the county of Winnebago and State of Illinois, have invented a new and useful Improvement in Harvester-Rakes, of which the following is a full, clear, and exact description, reference being had to the accompanying drawings, which make part of this specification, in which—

Figure 1 represents a view, in perspective, of my improved rake, showing it in the act of commencing to sweep off the gavel; and Fig. 2 a similar view of the same, the black lines showing the position of the parts while compressing the gavel and the red lines their position when swung round to drop it.

My invention relates to that class of automatic rakes for harvesters in which the cut grain is swept across the platform by a rake traversing from the grain to the stubble side, compressed into a compact gavel, turned so that its stalks may be at a right angle, or nearly so, to the path of the machine, and dropped upon the ground behind the driving-wheel and out of the path of the team in cutting the succeeding swath.

The improvement herein claimed consists, first, in turning the rake by an eccentric or cam groove rotating on a shaft mounted in a swinging arm and controlled by a pin or fixed stop on the frame; second, in providing a swinging jointed rake with a crank-shaft which opens and closes the rake, and which carries an eccentric that swings the rake; third, in making the swinging arm tubular to contain the crank-shaft; fourth, in combining a cam-groove, rotating on a crank-shaft passing through a swinging arm, a rake-stale pivoted to the swinging arm, and a compressing-palm, also connected to the same arm.

In the accompanying drawings, which exemplify one way of carrying out the objects of my invention, A represents a platform of suitable construction, upon the gearing end of which (or upon the main or gearing frame) a curved bracket, post, or standard, B, is mounted. A swinging arm or crane-post, C, is pivoted to swing freely horizontally in bearings $c$ in this standard, while a rake head or stale, D, is in like manner pivoted to this crank-post by a joint, $d$. The crane-post is tubular, to permit a crank-shaft, E, to pass through it, its pitman F being pivoted to the stale D by a swiveling joint $f$.

A cam-groove or eccentric, G, is mounted upon the inner end of the crank-shaft and turns with it, both being driven by a counter-shaft, H, to which they are connected by a universal joint, $h$. The counter-shaft may be driven in any suitable way. The rake is expanded and contracted by its crank and pitman, while its swinging or turning movements are governed by the eccentric, which is controlled by a pin, I, fixed to standard B.

The operation of the rake is as follows, the parts being supposed to start from the position shown by the red lines in Fig. 2: The eccentric and crank shaft being rotated in the direction of arrow 1, the rake J is simultaneously opened by the rotation of the crank and swung round by the eccentric into the position shown in Fig. 1, its teeth traversing the path described by the blue dotted lines, passing in behind the grain lying upon the platform and close to the divider, and then sweeping the grain directly across the platform and compressing it against a guard or palm, K, attached to the turning-post C. The parts now occupy the position shown in black in Fig. 2. The cam then swings the rake into the position shown in red lines in Fig. 2, the rake opens and drops the gavel at a right angle to its former position, and the operation above described is again repeated.

It will be noticed that the arrangement of the eccentric and crank is such that the rake is thrown across the back of the platform with a swift motion; that it moves more slowly while passing alongside the divider; that the full force of the crank is applied while raking and compressing; that the turning takes place while the crank is passing its dead-center, and consequently moving most slowly; and that the weight of the parts aids the turning movement. This enables me to develop the mechanical forces required to operate the rake with the exertion of the minimum of power.

I have shown and described only such parts of a harvester as were necessary to illustrate my invention; but in practice they will of course be adapted to a completely-organized machine.

My invention is equally adapted either to one-wheeled or two-wheeled machines, to those having a hinge-joint as well as to those with rigid finger-beams.

It is obvious that the path described by the rake-teeth can be varied by altering the curves of the cam-groove, and that the teeth and rake-arms might be made to travel in planes inclined to the platform instead of parallel to it, as shown in the drawings.

What I claim as my invention, and desire to secure by Letters Patent, is—

1. Turning an automatic rake by a cam-groove or eccentric rotating on a crane-post or swinging arm, and controlled by a pin fixed on the frame, substantially in the manner described.

2. The combination of a swinging jointed rake with a cam-groove which turns or swings the rake, and with a crank which opens and closes the rake, substantially in the manner described.

3. The combination of the tubular swinging arm with the crank-shaft passing through it, substantially as described.

4. The combination of a cam-groove, a crank-shaft, a swinging arm, a rake-stale, and a compressing-palm, substantially in the manner described.

In testimony whereof I have hereunto subscribed my name.

JOHN BARNES.

Witnesses:
ALLEN MARSHALL,
D. W. MILLER.